United States Patent [19]

Dabringhaus

[11] Patent Number: 4,561,703
[45] Date of Patent: Dec. 31, 1985

[54] LINEAR RECIRCULATING ROLLER BEARING ASSEMBLY

[75] Inventor: Gustav H. Dabringhaus, Birmingham, Mich.

[73] Assignee: Gustav Dabringhaus Revocable Trust, Birmingham, Mich.

[21] Appl. No.: 402,960

[22] Filed: Jul. 29, 1982

[51] Int. Cl.$^4$ ............. F16C 29/06; F16C 29/04
[52] U.S. Cl. ............................. 308/6 C; 308/6 R
[58] Field of Search ........... 308/6 C, 6 A, 6 R, 4 A, 308/6 B; 59/78, 84, 85, , 90, 91; 29/DIG. 73; 474/206, 209, 212–217; 198/725, 730

[56] References Cited

U.S. PATENT DOCUMENTS

| | | | |
|---|---|---|---|
| 1,386,986 | 8/1921 | Brierley | 308/217 X |
| 2,158,622 | 5/1939 | Festenberg-Pakisch | 474/206 X |
| 2,248,189 | 7/1941 | Pierce | 474/214 X |
| 3,003,828 | 6/1957 | Stark | 308/6 |
| 3,194,612 | 7/1965 | Striepe | 308/6 C |
| 3,200,770 | 8/1965 | Hendry | 308/6 C |
| 3,241,890 | 3/1966 | Stallman | 308/6 C |
| 3,248,900 | 5/1966 | Shurts | |
| 3,341,262 | 9/1967 | Kalmanek | 308/6 |
| 3,410,614 | 11/1968 | Shaw | 308/6 C |
| 3,836,211 | 9/1974 | Pfister-Schneeberger | 308/6 R |

FOREIGN PATENT DOCUMENTS

| | | | |
|---|---|---|---|
| 81533 | 4/1971 | German Democratic Rep. | |
| 157726 | 8/1978 | Netherlands | 474/206 |
| 359988 | 7/1976 | U.S.S.R. | 308/6 C |

Primary Examiner—Stuart S. Levy
Assistant Examiner—Thomas R. Hannon
Attorney, Agent, or Firm—Gerald E. McGlynn, Jr.

[57] ABSTRACT

A linear recirculating roller bearing assembly comprises a bearing body having a load bearing surface and a return surface disposed substantially parallel to each other and defining a path for continuous recirculating movement of roller bearings thereabout. A plurality of substantially identical roller bearings are disposed along the path in engagement with the aforementioned surfaces. Each of the roller bearings has a longitudinal axis and includes at least two cylindrical load bearing portions and at least one cylindrical axle portion disposed intermediate the load bearing portions. The portions of each roller bearing are substantially concentric with the longitudinal axis of the latter and the axle portion has a diameter smaller than the diameter of the load bearing portions. A plurality of substantially identical retaining clips operatively interconnect each of the axle portions of adjacent roller bearings to maintain the latter in predetermined spaced relationship with their axes maintained substantially perpendicular to the aforementioned path as the roller bearings circulate thereabout. A rotatable sprocket is provided at one end, and preferably at both ends, of the bearing body to maintain the alignment of the roller bearings substantially perpendicular to their direction of travel along the aforementioned path.

18 Claims, 6 Drawing Figures

U.S. Patent  Dec. 31, 1985  Sheet 1 of 2  4,561,703

LINEAR RECIRCULATING ROLLER BEARING ASSEMBLY

BACKGROUND OF THE INVENTION

(1) Field of the Invention

This invention relates to a linear recirculating roller bearing assembly of the type including a plurality of roller bearings disposed in a predetermined side-by-side spaced relationship for rolling recirculating movement along substantially parallel spaced load bearing and return surfaces.

(2) Description of the Prior Art and Prior Art Statement

Such linear recirculating roller bearing assemblies are, in general, well known in the prior art and are of various different configurations. Linear recirculating roller bearing assemblies of the general type to which the present invention pertains are illustrated in the U.S. patents Stark U.S. Pat. No. 3,003,828, Shurts U.S. Pat. No. 3,248,900, Kalmanek U.S. Pat. No. 3,341,262, and Pfister-Schneeberger U.S. Pat. No. 3,836,211, and U.S. Pat. No. 81 533 issued by the German Democratic Republic under the Ausgabetag date of 20 IV 1971. However, the prior art constructions pose various problems which are overcome by the instant invention.

For example, in most instances the prior art constructions do not provide an effective means for maintaining adjacent roller bearings in predetermined spaced relationship with respect to each other as they recirculate about the assembly, thereby resulting in skewing and scuffing of the roller bearings and consequent deleterious wear on the assembly. Even in those instances where links are employed to operatively interconnect adjacent roller bearings in an effort to keep them spaced from each other, the individual roller bearings are permitted to cock or skew with respect to their direction of recirculating travel about the assembly, again resulting in adverse wear. In those instances in which means are not provided to operatively interconnect adjacent roller bearings to maintain them in a predetermined spaced relationship with respect to each other, it is necessary in the prior art to provide caps or other retaining means at each end of the assembly which increases the overall size of the assembly. Stated another way, the elimination of the need for end caps or guides, as is the case with the present invention, enables the use of a greater number of roller bearings for an assembly of any given size thereby increasing the load bearing properties of the assembly.

SUMMARY OF THE INVENTION

In accordance with the subject invention, there is provided a linear recirculating roller bearing assembly comprising a bearing body having a load bearing surface and a return surface defining a path for continuous recirculating movement of roller bearings thereabout, a plurality of substantially identical roller bearings disposed about said path in engagement with said surfaces, each of said roller bearings having a longitudinal axis and including at least two cylindrical load bearing portions and at least one cylindrical axle portion disposed intermediate said load bearing portions, said portions being substantially concentric with said axis and said axle portion having a smaller diameter than said load bearing portions, and a plurality of substantially identical retaining clips operatively interconnecting each of said axle portions of adjacent roller bearings to maintain the latter in predetermined spaced relationship and their axes substantially perpendicular to said path as said roller bearings travel thereabout.

BRIEF DESCRIPTION OF THE DRAWINGS

These and other features and advantages of the invention will appear more fully hereinafter as the description thereof proceeds, reference being made to the drawings in which.

DESCRIPTION OF THE PREFERRED EMBODIMENTS

Figure 1:
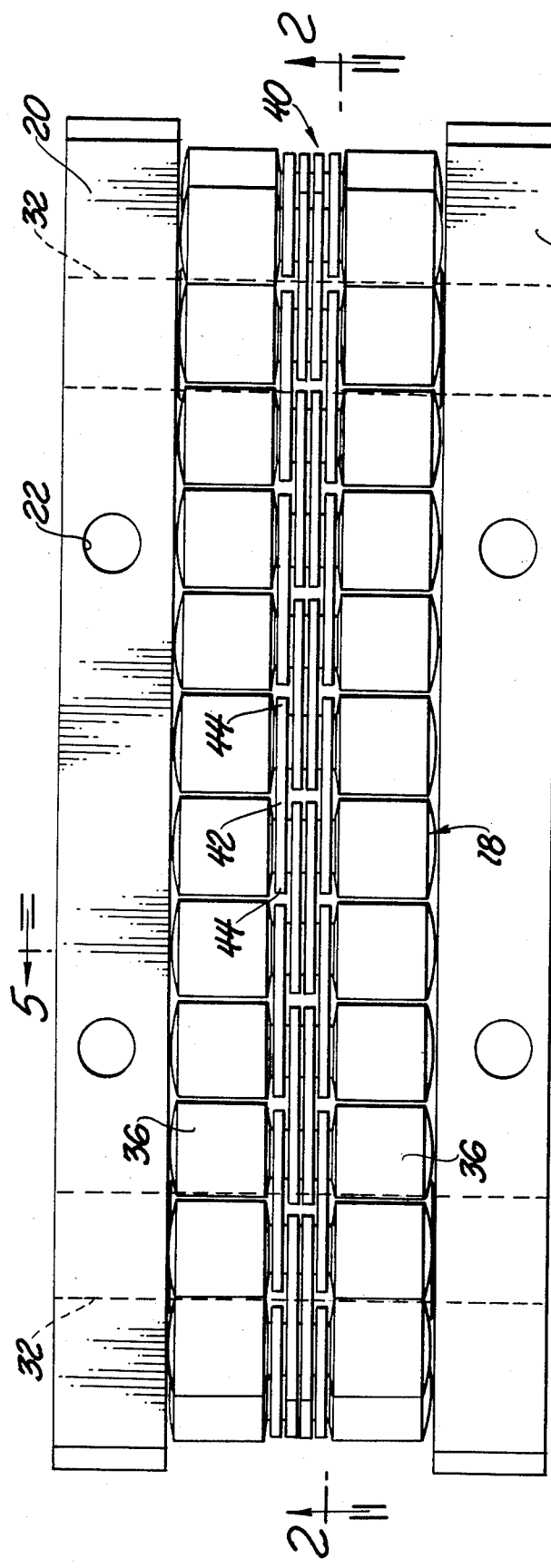
FIG. 1 is a top plan view of a linear recirculating roller bearing illustrating one preferred embodiment of the invention.
Figure 2:
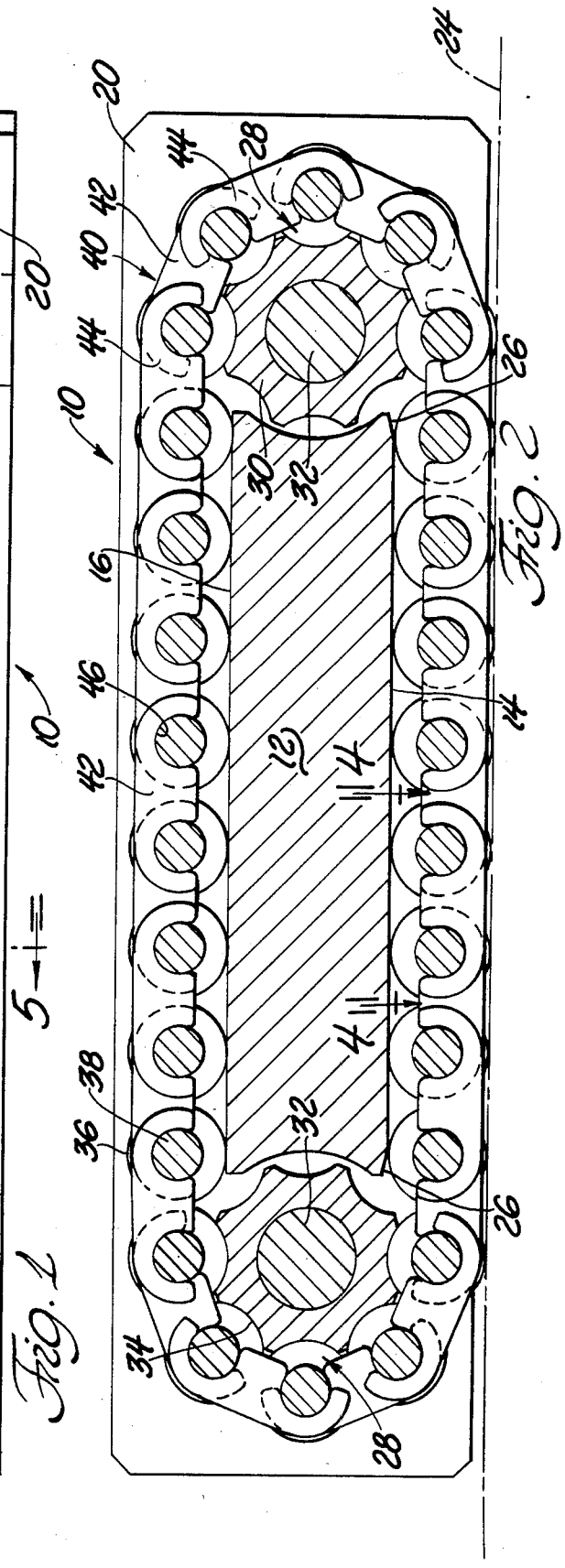
FIG. 2 is a sectional view taken on line 2—2 of FIG. 1.

Referring now to the embodiment of the invention illustrated in FIGS. 1 through 5, the numeral 10 generally indicates a linear recirculating roller bearing assembly constructed in accordance with the subject invention. The assembly comprises an integral bearing body 12 having a load bearing surface 14 and a return surface 16 disposed substantially parallel to each other and defining a path for continuous recirculating movement of a plurality of roller bearings, indicated generally at 18, thereabout. The bearing body further includes a pair of laterally spaced substantially parallel side walls or flanges 20 straddling the load bearing surface 14 and return surface 16 and extending beyond the ends of the latter. The upper surfaces of the side walls or flanges 20 are provided with threaded apertures 22 or the like for the purpose of securing the assembly to an element (not shown) which is to be supported by the bearing assembly for linear movement with respect to the plane, indicated in dotted line at 24 in FIGS. 2, 3 and 5, of a support element (not shown) for the bearing assembly. It will be noted that the side walls or flanges 20 extend beyond the diameter of the roller bearings 18 disposed along the return surface 16 while, on the other hand, being of such dimension as to expose the roller bearings when the latter are disposed in engagement with the load bearing surface 14 and the plane 24.

The opposite ends of the load bearing surface 14 are beveled or inclined at an angle to the plane containing the load bearing surface and plane 24 to define the ramps 26 extending laterally across the entire width of the load bearing surface. The angle of inclination of the ramps will vary from one installation to another but, in any event, is selected to facilitate feeding or ingress of the roller bearings 18 to the load bearing surface 14 and the egress of such roller bearings from the load bearing surface as the assembly traverses the plane 24 and as will be described more fully hereinafter.

Alignment means, indicated generally at 28, are provided at each end of the bearing body 12 and is disposed in the path of travel of the roller bearings 18 to align the longitudinal axes of the latter substantially perpendicular to the direction of travel of the roller bearings along their path of travel between the load bearing surface 14 and return surface 16. More specifically, each such alignment means comprises a sprocket 30 rotatably mounted on a shaft or pin 32 extending between and press fit, or otherwise suitably fixedly secured, to the side walls or flanges 20 at each end of the bearing body. Each of the sprockets 30 extends between the side walls or flanges 20 and includes a plurality of circumferentially spaced arcuate pockets 34 for seating the roller bearings 18 as they travel between the load bearing and return surfaces of the assembly in a manner which will become more apparent as the description proceeds.

The roller bearings 18 are substantially identical to each other and extend between the side walls or flanges 20 with their longitudinal axes substantially perpendicular to the path of recirculating travel about the load bearing surface 14 and return surface 16. Each of the roller bearings comprises a pair of cylindrical load bearing portions 36 and a cylindrical axle portion 38 disposed intermediate or midway between the load bearing portions. The load bearing and axle portions are substantially concentric with each other and the longitudinal axis of rotation of the roller bearing, the diameter of the axle portion being less than the diameter of the load bearing portion. As will be clear from the drawings, the load bearing portions of each roller bearing are engageable with the load bearing surface 14 and return surface 16 of the bearing body. Moreover, as the roller bearings recirculate between the load bearing surface and return surface of the bearing body, the load bearing portions 36 are seated within the respective pockets 34 of the sprockets to continuously align the longitudinal axes of the roller bearings substantially perpendicular to the path of travel about the assembly.

Figure 3:
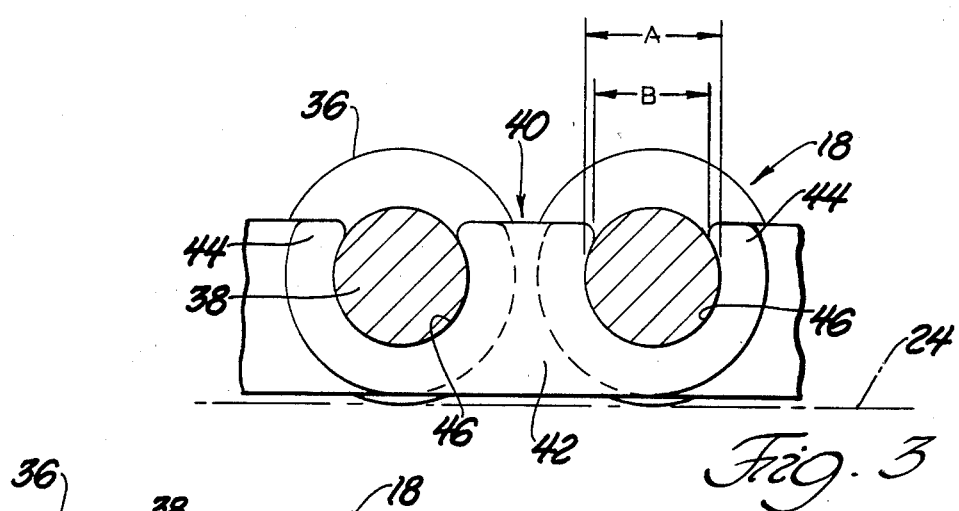
FIG. 3 is a fragmentary enlarged view of a portion of FIG. 2 illustrating certain details of the construction.

A plurality of substantially identical retaining clips, indicated generally at 40, operatively interconnect each of the axle portions 38 of adjacent roller bearings to maintain the latter in close but predetermined spaced relationship to each other with the axes of the roller bearings maintained substantially perpendicular to the path of travel about the assembly. More specifically, each of the retaining clips 40 comprises a central body portion 42 and spaced leg portions 44 extending from opposite ends thereof and coacting therewith to define arcuate seats 46 embracing the axle portions of adjacent roller bearings. As will be apparent particularly as illustrated in FIG. 3, the leg portions 44 are yieldable with respect to the central body portion 42 of the clips so as to define openings in the clips movable from a first size or dimension indicated at "B" less than the diameter of the axle portions of the roller bearings and a second dimension or size indicated by the letter "A" at least equal to the diameter of the axle portion to permit assembly and disassembly of the retaining clips with respect to the axle portions of the roller bearings. In other words, the clips are sufficiently yieldable to permit the clips to be snapped on and off the axle portions of the roller bearings while, when installed on the roller bearings, being sufficiently rigid to maintain the roller bearings in close but predetermined spaced relationship with respect to each other at all times to avoid skewing and scuffing of adjacent rollers.

Figure 4:
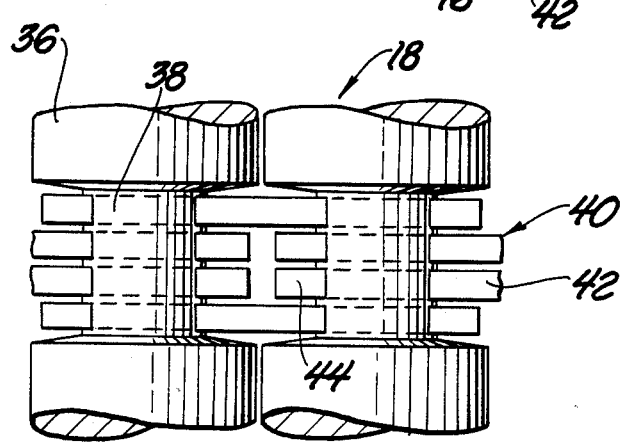
FIG. 4 is an enlarged sectional view taken along line 4—4 of FIG. 2.
Figure 5:
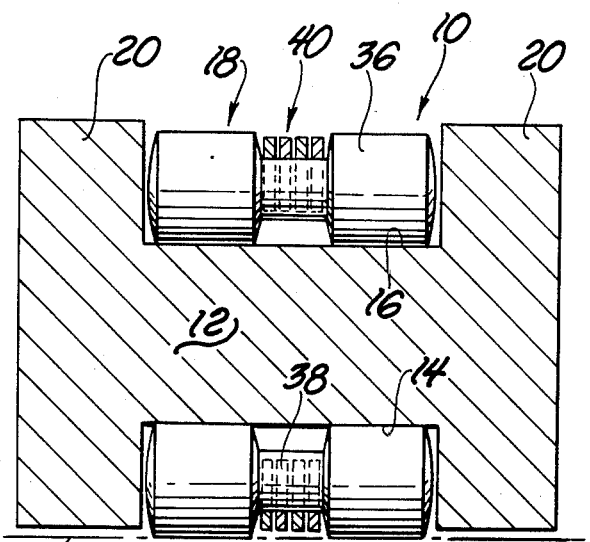
FIG. 5 is an enlarged sectional view taken along line 5—5 of FIG. 1.

With reference particularly to FIGS. 4 and 5, it will be noted that there are four clips 40 stacked in side-by-side relationship on the axle portion of each roller bearing and confined between the load bearing portions of the roller bearings. Of each stacked group of four clips, the central two clips associated with the axle portion of any one given roller bearing are connected to the axle portion of a roller bearing located immediately adjacent and to one side of the aforementioned one roller bearing, while the other two clips, respectively located to either side of the central two clips, are connected to the axle portion of the roller bearing to the other side of the given one of the roller bearings as referred to above. Thus, the pulling or dragging force exerted by one roller bearing on an immediately adjacent and trailing roller bearing is substantially equalized as the roller bearings travel about their path in the assembly. Moreover, should dirt or other debris be deposited on the load bearing surface 14 or return surface 16 tending to skew or cock the roller bearings, such cocking or skewing action is minimized due to the location of the retaining clips intermediate the ends of the roller bearings and, in any event, the magnitude of any such cocking or skewing movement is limited to the extent of at all times preventing adjacent rollers from scrubbing against each other. In addition, as soon as the roller bearings engage one or the other of the sprockets 30, they are automatically realigned to have their longitudinal axes disposed substantially perpendicular to the desired path of travel about the assembly.

At this juncture, it should be observed that a stack of retaining clips 40 greater in number than the four clips illustrated for each axle portion may be utilized so long as the number of clips employed will provide an equalized pulling or dragging action on adjacent roller bearings. More specifically, and for example, any number of clips, which is divisible by the numeral 2, may be employed in any given stack of clips. For example, if it is desired to use a stack of eight clips, four clips would be disposed centrally of the axle portion of any given roller bearing, and a set of two clips each would be disposed to either side of the central group of four clips. As another example, if sixteen clips are to be stacked on each axle portion, a group of eight would be disposed centrally of the axle portion and a group of four clips would be disposed on each side of the central group.

As alluded to previously, the ramps 26 at each end of the load bearing surface 14 are inclined at a predetermined angle with respect to the diameter of the load bearing portions 36 of the roller bearings and the plane 24 of the surface upon which the bearing assembly rides to facilitate entry of the roller bearings onto the load bearing surface 14 and the exit of the roller bearings from such surface. More specifically, the angle of inclination of the ramps 26 is selected so that the tip or edge of the ramp, or a portion of the ramp closely adjacent thereto, has a height relative to the plane 24 which is less than the diameter of the load bearing portions 36 of the roller bearings. As a consequence, as each roller bearing moves from a sprocket 30 toward the load bearing surface 14, it will engage a ramp 26 whereupon it is immediately placed in compression to some extent, such compression or load being, of course, less than the total compression or load to which the roller bearing will be subjected upon engagement with the load bearing surface 14. In any event, the partial loading of a roller bearing by the coaction between the ramp and the plane 24 of the surface supporting the bearing assembly in essence drives the roller bearing into engagement with the load bearing surface 14, thereby preventing any extreme load, if any load whatsoever, on the stack of retaining clips 40 interconnecting a preceding roller bearing and the trailing roller bearing just engaging the ramp.

Referring now particularly to FIG. 5, the side walls or flanges 20 function as bearing means coacting with the ends of each of the roller bearings 18, particularly as they travel along the load bearing surface 14, to absorb side loads or loads imposed along the longitudinal axes of the roller bearings while preventing imposition of such loads on the stacked clips 40 engaging the roller bearings. More specifically, the clearance between the ends of the roller bearings and the side walls or flanges 20 is less than the clearance between the load bearing portions 36 of the roller bearings and the total stacked width of the retaining clips 40 disposed about the axle portions. Thus, any side loads or loads acting generally along the longitudinal axes of the roller bearings 18 will cause one end or the other of the latter to engage one or the other of the side walls or flanges 20 before such load may be physically communicated to the stacked width of retaining clips.

Figure 6:
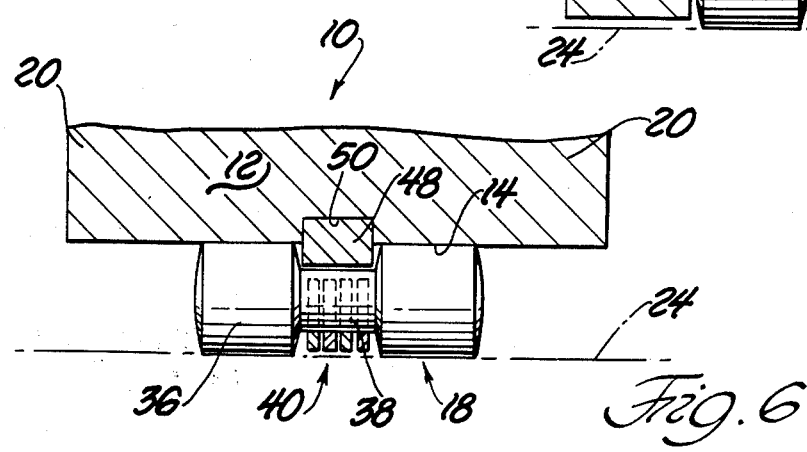
FIG. 6 is an enlarged cross sectional view corresponding generally to FIG. 5 and illustrating another preferred embodiment of the invention.

Referring now to the embodiment of FIG. 6, this embodiment is substantially identical in most respects to the embodiment previously described and, hence, like numerals are employed with respect to FIG. 6 to indicate structure previously described with respect to the embodiment of FIGS. 1 through 5. In the embodiment of FIG. 6, the portion of the side walls or flanges 20 extending below the plane of the load bearing surface 14 are eliminated. Furthermore, a longitudinally extending rail 48 is disposed in the key way 50 or otherwise suitably secured to the load bearing surface 14 and extends the length of the latter centrally of, and in opposed relation to, the axle portions 38 of the roller bearings. The width of the rail is greater than the stacked width of the retaining clips 40. Hence, the rail 48 functions as a bearing means, in the fashion described above with respect to the previous embodiment, to absorb side loads or loads imposed generally longitudinally of the axes of the roller bearings while preventing the imposition of such loads on the stacked retaining clips.

While but two forms of the invention have been shown and described, other forms will now be readily apparent to those acquainted with this art. Therefore, it is to be understood that the embodiments illustrated in the drawing and described above are merely for illustrative purposes, and are not to limit the scope of the invention which is defined by the claims which follow.

The embodiments of the invention in which an exclusive property or privilege is claimed are defined as follows:

1. A linear recirculating roller bearing assembly comprising a bearing body having a load bearing surface and a return surface defining a path for continuous recirculating movement of roller bearings thereabout, a plurality of substantially identical roller bearings disposed about said path in engagement with said surfaces, each of said roller bearings having a longitudinal axis and including at least two cylindrical load bearing portions and at least one cylindrical axle portion disposed intermediate said load bearing portions, said portions being substantially concentric with said axis and said axle portion having a smaller diameter than said load bearing portions, and a plurality of substantially identical retaining clips operatively interconnecting each of said axle portions of adjacent roller bearings to maintain the latter in predetermined spaced relationship and their axes substantially perpendicular to said path as said roller bearings travel thereabout, and wherein at least two of said retaining clips are operatively connected to said axle portion of any given one of said roller bearings and to said axle portion of an immediately adjacent roller bearing to one side of said given one of said roller bearings and the remaining retaining clips are disposed between the aforesaid two retaining clips and are operatively connected to said axle portion of an immediately adjacent roller bearing to the other side of said given one of said roller bearings.

2. A linear recirculating roller bearing assembly comprising a bearing body having a load bearing surface and a return surface defining a path for continuous recirculating movement of roller bearings thereabout, a plurality of substantially identical roller bearings disposed about said path in engagement with said surfaces, each of said roller bearings having a longitudinal axis and including at least two cylindrical load bearing portions and at least one cylindrical axle portion disposed intermediate said load bearing portions, said portions being substantially concentric with said axis and said axle portion having a smaller diameter than said load bearing portions, and a plurality of substantially identical retaining clips operatively interconnecting each of said axle portions of adjacent roller bearings to maintain the latter in predetermined spaced relationship and their axes substantially perpendicular to said path as said roller bearings travel thereabout, and wherein the number of said retaining clips operatively connected to any given one of said axle portions of any given one of said roller bearings is at least four and is divisible by the numeral 2, one-half of said number of said retaining clips being operatively connected to said axle portion of an immediately adjacent roller bearing to one side of said given one of said roller bearings and the other one-half of said number of said retaining clips being operatively connected to said axle portion of an immediately adjacent roller bearing to the other side of said given one of said roller bearings.

3. The invention as defined in claim 2 wherein said retaining clips each include a central body portion and spaced leg portions extending from opposite ends thereof and coacting therewith to define arcuate seats embracing said axle portions of adjacent roller bearings and openings communicating with said seats, each of said leg portions being yieldable relative to said central body portion to vary the size of said openings between a first size less than the diameter of said axle portions of said roller bearings and a second size at least equal to such diameter to permit assembly and disassembly of said retaining clips with respect to said roller bearings.

4. The invention as defined in claim 2 further comprising alignment means disposed at least at one end of said bearing body along said path for engagement with said roller bearings to align the longitudinal axes of the latter substantially perpendicular to the direction of travel of said roller bearings along said path.

5. The invention as defined in claim 4 wherein said alignment means comprises a sprocket including a plurality of circumferentially spaced arcuate pockets for seating said load bearing portions of said roller bearings, and means rotatably mounting said sprocket on said bearing body with the center of curvature of each of said arcuate pockets being disposed substantially perpendicular to the direction of travel of said roller bearings along said path.

6. The invention as defined in claim 5 wherein there is one of said sprockets disposed at each end of said bearing body along said path.

7. The invention as defined in claim 2 wherein said load bearing surface of said bearing body has opposite ends which are included at an angle to a plane containing said load bearing surface to define ramps, the height of at least a portion of said ramps relative to the plane of the surface to be engaged by said load bearing portions of said roller bearings being less than the diameter of the latter.

8. The invention as defined in claim 2 further comprising bearing means carried by said bearing body and coacting with said roller bearings to absorb side loads imposed on the latter while preventing imposition of such loads on said retaining clips.

9. The invention as defined in claim 8 wherein said bearing means comprises a pair of laterally spaced substantially parallel side walls on said bearing body straddling said load bearing surface, the clearance between the opposite ends of said roller bearings and said side walls being less than the clearance between the ends of said axle portions of said roller bearings and the stacked width of said retaining clips operatively secured thereto.

10. The invention as defined in claim 8 wherein said bearing means comprises a rail operatively secured longitudinally along the length of and projecting from said load bearing surface in opposed spaced relation to said axle portions of said roller bearings, the width of said rail being greater than the stacked width of said retaining clips opertively connected to said axle portions of said roller bearings.

11. A linear recirculating roller bearing assembly comprising a bearing body having a load bearing surface and a return surface disposed substantially parallel to each other and defining a path for continuous recirculating movement of roller bearings thereabout, a plurality of substantially identical roller bearings disposed about said path in engagement with said surfaces, each of said roller bearings having a longitudinal axis and including at least two substantially identical cylindrical load bearing portions and at least one cylindrical axle portion disposed intermediate said load bearing portions, said portions being substantially concentric with said axis and said axle portions having a smaller diameter than said load bearing portions, and a plurality of substantially identical retaining clips operatively interconnecting each of said axle portions of adjacent roller bearings to maintain the latter in predetermined spaced relationship and their axes substantially perpendicular to said path as said roller bearings travel thereabout, and wherein the number of said retaining clips operatively connected to any given one of said axle portions of any given one of said roller bearings is at least four and is divisible by the numeral 2, one-half of said number of said retaining clips being operatively connected to said axle portion of an immediately adjacent roller bearing to one side of said given one of said roller bearings and the other one-half of said number of said retaining clips being operatively connected to said axle portion of an immediately adjacent roller bearing to the other side of said given one of said roller bearings.

12. The invention as defined in claim 11 wherein said retaining clips each includes a central body portion and spaced leg portions extending from opposite ends thereof and coacting therewith to define arcuate seats embracing said axle portions of adjacent roller bearings and openings communicating with said seats, each of said leg portions being yieldable relative to said central body portion to vary the size of said openings between a first size less than the diameter of said axle portions of said roller bearings and a second size at least equal to such diameter to permit assembly and disassembly of said retaining clips with respect to said roller bearings.

13. The invention as defined in claim 12 further comprising alignment means disposed at least at one end of said bearing body along said path for engagement with said roller bearings to align the longitudinal axes of the latter substantially perpendicular to the direction of travel of said roller bearings along said path.

14. The invention as defined in claim 13 wherein said alignment means comprises a sprocket including a plurality of circumferentially spaced arcuate pockets for seating said load bearing portions of said roller bearings, and means rotatably mounting said sprocket on said bearing body with the center of curvature of each of said arcuate pockets being disposed substantially perpendicular to the direction of travel of said roller bearings along said path.

15. The invention as defined in claim 14 wherein the opposite ends of said load bearing surface of said bearing body are inclined at an angle to the plane containing said load bearing surface to define ramps, the height of at least a portion of said ramps relative to the plane of the surface to be engaged by said load bearing portions of said roller bearings being less than the diameter of the latter.

16. The invention as defined in claim 15 further comprising bearing means carried by said bearing body and coacting with said roller bearings to absorb side loads imposed on the longitudinal axes of the latter while preventing imposition of such loads on said retaining clips.

17. The invention as defined in claim 16 wherein said bearing means comprises a pair of laterally spaced substantially parallel side walls on said bearing body straddling said load bearing surface, the clearance between the opposite ends of said roller bearings and said side walls being less than the clearance between the ends of said axle portions of said roller bearings and the stacked width of said retaining clips operatively secured thereto.

18. The invention as defined in claim 16 wherein said bearing means comprises a rail operatively secured longitudinally along the length of and projecting from said load bearing surface in opposed spaced relation to said axle portions of said roller bearings, the width of said rail being greater than the stacked width of said retaining clips operatively connected to said axle portions of said roller bearings.

* * * * *